(12) United States Patent
Dingli

(10) Patent No.: US 11,550,320 B2
(45) Date of Patent: Jan. 10, 2023

(54) VEHICLE REDUNDANT PROCESSING RESOURCE USAGE

(71) Applicant: Pony AI Inc., Grand Cayman (KY)

(72) Inventor: Robert Dingli, Cupertino, CA (US)

(73) Assignee: Pony AI Inc., Grand Cayman (KY)

(*) Notice: Subject to any disclaimer, the term of this patent is extended or adjusted under 35 U.S.C. 154(b) by 110 days.

(21) Appl. No.: 16/356,695

(22) Filed: Mar. 18, 2019

(65) Prior Publication Data

US 2020/0301418 A1 Sep. 24, 2020

(51) Int. Cl.
*G05D 1/00* (2006.01)
*G05D 1/02* (2020.01)
*G05B 9/03* (2006.01)

(52) U.S. Cl.
CPC ............. *G05D 1/0077* (2013.01); *G05B 9/03* (2013.01); *G05D 1/0223* (2013.01)

(58) Field of Classification Search
None
See application file for complete search history.

(56) References Cited

U.S. PATENT DOCUMENTS

| | | | |
|---|---|---|---|
| 7,111,808 B2 | 9/2006 | Sprenger | |
| 9,027,880 B2 | 5/2015 | Breuer | |
| 9,081,653 B2 | 7/2015 | Ricci et al. | |
| 9,463,877 B2 | 10/2016 | Ulbrich-Gasparevic | |
| 10,331,128 B1* | 6/2019 | Hansel | G05D 1/0061 |
| 2003/0130791 A1* | 7/2003 | McIntyre | G05D 1/0077 701/472 |
| 2003/0154009 A1* | 8/2003 | Basir | G07C 5/0866 348/148 |
| 2011/0035149 A1* | 2/2011 | McAndrew | G05D 1/0038 701/466 |
| 2012/0173900 A1 | 7/2012 | Diab et al. | |
| 2013/0204493 A1* | 8/2013 | Ricci | G06F 11/2038 701/41 |
| 2013/0282238 A1 | 10/2013 | Ricci et al. | |
| 2017/0093643 A1* | 3/2017 | Ricci | G08G 1/0129 |
| 2017/0210352 A1* | 7/2017 | Stauffer | G07C 5/006 |
| 2018/0348754 A1* | 12/2018 | Samii | G05B 23/0286 |
| 2019/0227826 A1* | 7/2019 | Taylor | G06F 9/5077 |
| 2019/0258251 A1* | 8/2019 | Ditty | G06V 20/58 |
| 2020/0026960 A1* | 1/2020 | Park | G06K 9/6218 |
| 2020/0285870 A1* | 9/2020 | Yi | G06K 9/6274 |
| 2021/0166325 A1* | 6/2021 | Shalev-Shwartz | B62D 15/025 |

\* cited by examiner

*Primary Examiner* — James J Lee
*Assistant Examiner* — Wenyuan Yang
(74) *Attorney, Agent, or Firm* — Sheppard Mullin Richter & Hampton LLP

(57) ABSTRACT

Systems, methods, and non-transitory computer readable media may be configured to facilitate usage of vehicle redundant processing resource. A primary processing resource may be dedicated to navigation control of a vehicle. A redundant processing resource may be provided for performing one or more tasks of the navigation control of the vehicle based on a failure of the primary processing resource. One or more available portions of the redundant processing resource may be used for performing one or more tasks of non-navigation control of the vehicle.

8 Claims, 5 Drawing Sheets

VEHICLE REDUNDANT PROCESSING RESOURCE USAGE

FIELD OF THE INVENTION

This disclosure relates to approaches for using redundant processing resource of a vehicle.

BACKGROUND

Vehicles may have non-time critical tasks and/or non-safety critical tasks that need to be performed. Performing these tasks may require processing resource.

SUMMARY

Various embodiments of the present disclosure may include systems, methods, and non-transitory computer readable media configured to facilitate usage of vehicle redundant processing resource. A primary processing resource may be dedicated to navigation control of a vehicle. A redundant processing resource may be provided for performing one or more tasks of the navigation control of the vehicle based on a failure of the primary processing resource. One or more available portions of the redundant processing resource may be used for performing one or more tasks of non-navigation control of the vehicle.

In some embodiments, the primary processing resource may be provided by first hardware and the redundant processing resource may be provided by second hardware. The first hardware may be separate from the second hardware.

In some embodiments, the primary processing resource and the redundant processing resource may be provided by same hardware.

In some embodiments, a portion of the redundant processing resource may be used to detect the failure of the primary processing resource.

In some embodiments, the task(s) of the navigation control of the vehicle may have higher priority than the task(s) of the non-navigation control of the vehicle for usage of the redundant processing resource.

In some embodiments, the task(s) of the navigation control of the vehicle may include one or more of vehicle direction control, vehicle speed control, vehicle route control, vehicle navigation, vehicle emergency stop, and/or vehicle vision analysis.

In some embodiments, the task(s) of the non-navigation control of the vehicle may include one or more non-time critical tasks and/or one or more non-safety critical tasks. For example, the task(s) of the non-navigation control of the vehicle may include one or more of passenger status detection, cabin-cleanliness detection, in-vehicle vision analysis, in-vehicle entertainment provision, and/or in-vehicle communication provision.

In some embodiments, usage of the available portion(s) of the redundant processing resource to perform the task(s) of the non-navigation control of the vehicle may enable status check of the redundant processing resource.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
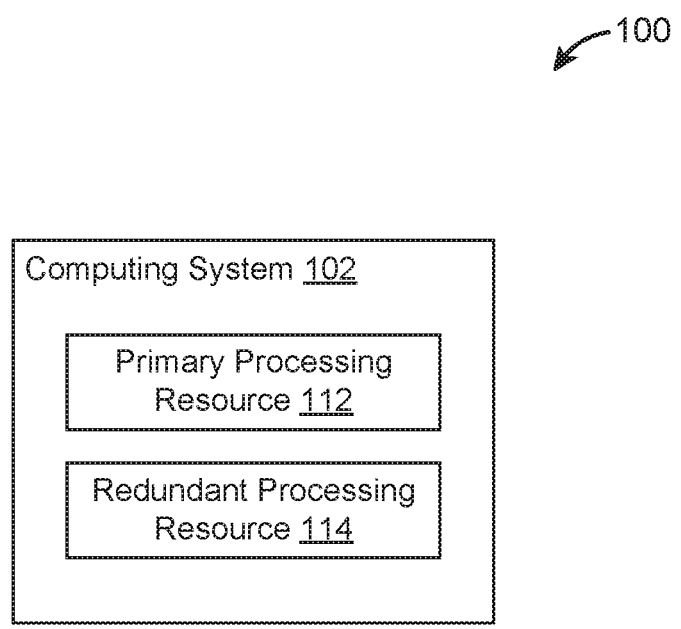
FIG. 1 illustrates an example environment for facilitating usage of vehicle redundant processing resource, in accordance with various embodiments.

In various implementations, a primary processing resource may be dedicated to navigation control of a vehicle, and a redundant processing resource may be provided for performing one or more tasks of the navigation control of the vehicle based on a failure of the primary processing resource. The redundant processing resource may be used as a backup to perform task(s) of the navigation control if and when the primary processing resource fails. One or more available portions of the redundant processing resource may be used for performing one or more tasks of non-navigation control of the vehicle. That is, portion(s) of the redundant processing resource that are not being used to perform task(s) of the navigation control may be used to perform task(s) of non-navigation control of the vehicle. Such usage of the redundant processing resource may enable the vehicle to perform task(s) of non-navigation control without having resources dedicated to the non-navigation control.

The primary processing resource and the redundant processing resource may be provided by same hardware (e.g., controller) or different hardware. The primary processing resource may be provided by first hardware (e.g., first controller) and the redundant processing resource may be provided by second hardware (e.g., second controller), with the first hardware being separate from the second hardware. The primary processing resource and the redundant processing resource may be provided by same hardware (e.g., within a single controller).

A portion of the redundant processing resource may be used to detect the failure of the primary processing resource. For example, a portion of the redundant processing resource may be used to monitor the primary processing resource and determine if and/or when the primary processing resource fails.

The task(s) of the navigation control of the vehicle may have higher priority than the task(s) of the non-navigation control of the vehicle for usage of the redundant processing resource. When a task of the navigation control of the vehicle and a task of the non-navigation control of the vehicle is queued for processing by the redundant processing resource, the redundant processing resource may perform the task of the navigation control of the vehicle before performing the task of the non-navigation control of the vehicle.

The task(s) of the navigation control of the vehicle may include one or more time critical tasks and/or one or more safety critical tasks for the vehicle. For example, the task(s) of the navigation control of the vehicle may include one or more of vehicle direction control, vehicle speed control, vehicle route control, vehicle navigation, vehicle emergency stop, vehicle vision analysis, and/or other time critical/safety critical tasks.

The task(s) of the non-navigation control of the vehicle may include one or more non-time critical tasks and/or one or more non-safety critical tasks. The task(s) of the non-navigation control of the vehicle may be performed for convenience of the persons (e.g., driver, passenger) in the vehicle. For example, the task(s) of the non-navigation control of the vehicle may include one or more of passenger status detection, cabin-cleanliness detection, in-vehicle vision analysis, in-vehicle entertainment provision, in-vehicle communication provision, and/or other non-time critical/non-safety critical tasks.

Usage of the available portion(s) of the redundant processing resource to perform the task(s) of the non-navigation control of the vehicle may enable status check of the redundant processing resource. For example, a portion of the redundant processing resource that is not being used to perform a task of the navigation control of the vehicle may be assigned to perform a task of the non-navigation control of the vehicle. If the task of the non-navigation control of the vehicle is not performed, the portion of the redundant processing resource and/or the redundant processing resource may be faulty.

.The approaches disclosed herein provides for performance of task(s) of non-navigation control of a vehicle through a redundant processing resource for navigation control of a vehicle. Given the importance of properly executing task(s) of navigation control of a vehicle, it is desirable to include within the vehicle a redundant processing resource for the navigation control of the vehicle. Rather than including within the vehicle separate processing resource dedicated to performing task(s) of non-navigation control, the redundant processing resource for the navigation control of the vehicle may be used to perform task(s) of non-navigation control when the redundant processing resource is not performing task(s) of navigation control. Additionally, usage of the redundant processing resource to perform task(s) of non-navigation control may be used to confirm that the redundant processing resource is working.

FIG. 1 illustrates an example environment 100 for facilitating usage of vehicle redundant processing resource, in accordance with various embodiments. The example environment 100 may include a computing system 102. The computing system 102 may include one or more processors and memory. The processor(s) may be configured to perform various operations by interpreting machine-readable instructions stored in the memory. The environment 100 may also include one or more datastores that are accessible to the computing system 102 (e.g., stored in the memory of the computing system 102, coupled to the computing system, accessible via one or more network(s)). In some embodiments, the datastore(s) may include various databases, application functionalities, application/data packages, and/or other data that are available for download, installation, and/or execution.

In various embodiments, the computing system 102 may include a primary processing resource 112, a redundant processing resource 114, and/or other components. While the computing system 102 is shown in FIG. 1 as a single entity, this is merely for ease of reference and is not meant to be limiting. One or more components/functionalities of the computing system 102 described herein may be implemented, in whole or in part, within a single computing device or within multiple computing devices. One or more portions of the computing system 102 may be implemented within a vehicle (e.g., autonomous vehicle). A vehicle may refer to a thing used to transport one or more persons and/or one or more things. Examples of vehicle may include an autonomous vehicle, a non-autonomous vehicle, a taxi, a ride-share vehicle, a vehicle owned by an organization, a personally owned vehicle, and/or other vehicles.

A processing resource (the primary processing resource 112, the redundant processing resource 114) may refer to a resource that performs one or more computing functions and/or that is used to perform one or more computing functions. A processing resource may refer to a supply of processing power available to the computing system 102. The computing system 102 may use one or more processing resources to perform one or more tasks, such as one or more tasks of navigation control or one or more tasks of non-navigation control. A processing resource may include one or more hardware that performs computation, such as one or more of a processor, a digital processor, an analog processor, a logic circuitry, a digital circuit, a central processing unit, a graphics processing unit, a microcontroller, an analog circuit, a state machine, and/or other mechanisms for electronically processing information. A processing resource may include one or more hardware that facilitates computation, such as connection between hardware components, memory (temporary memory, permanent memory), power supply, and/or other components.

The primary processing resource 112 and the redundant processing resource 114 may be provided by same hardware or different hardware. For example, the primary processing resource 112 and the redundant processing resource 114 may be provided by the same hardware (e.g., within a single controller). As another example, the processing resource 112 may be provided by one hardware (e.g., a controller) and the redundant processing resource 114 may be provided by another hardware (e.g., another controller), with the two hardware being separate. Separation of hardware providing the primary processing resource 112 and the redundant processing resource 114 may enable more robust and/or reliable operation by the computing device 102. For instance, if the primary processing resource 112 and the redundant processing resource 114 are provided by the same hardware, a fault (e.g., error in operation, damage to hardware) in the portion(s) of the hardware for the primary processing resource 112 may negatively affect the portion(s) of the hardware for the redundant processing resource 114, and vice versa. If the primary processing resource 112 and the redundant processing resource 114 are provided by different hardware, a fault in one hardware may not affect the other hardware.

The primary processing resource 112 and the redundant processing resource 114 may be provided by hardware of the same type or hardware of different types. For example, the primary processing resource 112 may be provided by hardware with hardware-based logic while the redundant processing resource 114 may be provided by hardware with software-based logic. The capacity of hardware providing the primary processing resource 112 and the redundant processing resource 114 may be the same or different. For example, the primary processing resource 112 and the redundant processing resource 114 may be provided by two equal/same controller, or the controller providing the primary processing resource 112 may have greater capacity (e.g., processing speed, power, memory) than the controller providing the redundant processing resource 114.

In various embodiments, the primary processing resource 112 may refer to a processing resource that is dedicated to navigation control of a vehicle. Navigation control of a vehicle may refer to control of movement of the vehicle. Navigation control of a vehicle may include control of translational movement (e.g., forward movement, backward movement, lateral movement, vertical movement) and/or control of angular movement (e.g., rotation, tilt, turn) of the vehicle. Navigation control of a vehicle may include control of speed and/or acceleration of the vehicle. Navigation control of a vehicle may include control of a route and/or a planned path for the vehicle to take from one location to another location. Navigation control of a vehicle may include other types of control for the vehicle to facilitate movement of the vehicle.

Navigation control of a vehicle may include one or more tasks. Navigation control of a vehicle may be facilitated and/or effectuated through performance of one or more tasks. A task may refer to a piece of work to be done. For example, a task of navigation control of a vehicle may refer to a piece of work to be done to facilitate navigation control of the vehicle. For instance, a task of navigation control of a vehicle may include one or more functions and/or operations to be performed to facilitate/effectuate control of (e.g., determining values of, initiating action of, changing action in progress of, planning action of) translational movement, angular movement, speed, acceleration, route, planned path, and/or other movement of the vehicle.

One or more tasks of navigation control of a vehicle may include one or more time critical tasks and/or one or more safety critical tasks for the vehicle. A time-critical task may refer to a task for a vehicle for which timeliness or speed is a crucial factor. A safety critical task may refer to a task for a vehicle for which performance is crucial to safe operation of the vehicle, such as a task performed to maintain the safety of person(s) inside the vehicle and/or to avoid accidents due to vehicle movement and/or lack of vehicle movement. For example, one or more tasks of the navigation control of the vehicle may include one or more of vehicle direction control (e.g., controlling direction in which the vehicle moves), vehicle speed control (e.g., controlling speed and/or acceleration of the vehicle), vehicle route control (e.g., determining, monitoring, and/or changing route to be taken by the vehicle), vehicle navigation (e.g., the vehicle following a route/planned path and/or monitoring the vehicle's movement along a route/planned path), vehicle emergency stop (e.g., stopping the vehicle in an emergency, bringing the vehicle to a safe stop in an emergency), vehicle vision analysis (e.g., controlling one or more image capture devices capturing one or more images/videos of the environment of the vehicle, analyzing image(s)/video(s) of the environment for object detection, perception control/analysis for vehicle navigation), and/or other time critical/safety critical tasks.

The primary processing resource 112 being dedicated to navigation control of a vehicle may include the primary processing resource 112 being reserved to perform one or more tasks of navigation control of the vehicle. The primary processing resource 112 may be provided in and/or by the computing system 102 to perform one or more tasks of navigation control of the vehicle. That is, when one or more tasks of navigation control of the vehicle needs to be performed, the computing system 102 may use the primary processing resource 112/one or more portions of the primary processing resource 112 to perform the task(s).

In various embodiments, the redundant processing resource 114 may refer to a processing resource that operates as backup for the primary processing resource 112. The redundant processing resource 114 operating as backup for the primary processing resource 112 may include the redundant processing resource 114 being used to perform one or more tasks of navigation control for a vehicle based on the failure of the primary processing resource 112. That is, the redundant processing resource 114 may be used as a backup to perform task(s) of the navigation control if and/or when the primary processing resource 112 fails. That is, if and/or when the primary processing resource 112 is unable to perform task(s) of navigation control of a vehicle, the computing system 102 may use the redundant processing resource 114/one or more portions of the redundant processing resource 114 to perform the task(s).

Failure of the primary processing resource 112 may include the primary processing resource 112 being unable to perform one or more tasks of navigation control of a vehicle. Failure of the primary processing resource 112 may include the primary processing resource 112 being unavailable to perform one or more tasks of navigation control of a vehicle. Failure of the primary processing resource 112 may include the primary processing resource 112 failing to perform according to an accepted level/standard of operation. Failure of the primary processing resource 112 may include defect and/or improper use of one or more hardware of the primary processing resource 112. For example, failure of the primary processing resource 112 may include the primary processing resource 112 returning error condition(s) and/or the hardware of the primary processing resource 112 being damaged. Other failure of the primary processing resource 112 are contemplated.

One or more available portions of the redundant processing resource 114 may be used for performing one or more tasks of non-navigation control of the vehicle. The redundant processing resource 114 may be provided in and/or by the computing system 102 to perform one or more tasks of non-navigation control of the vehicle. That is, when a task of non-navigation control of the vehicle needs to be performed, the computing system 102 may use the redundant processing resource 114/one or more available portions of the redundant processing resource 114 to perform the task. An available portion of the redundant processing resource 114 may refer to a portion of the redundant processing resource 114 that is not being used (e.g., not currently being used, have not been assigned to be used) to perform one or more tasks of navigation control of the vehicle. In other words, when one or more tasks of non-navigation control of the vehicle needs to be performed, the computing system 102 may use the portion(s) of the redundant processing resource 114 that are not being used to perform task(s) of the navigation control to perform task(s) of non-navigation control of the vehicle.

Such usage of the redundant processing resource 114 may enable the computing system 102 to perform task(s) of non-navigation control without having resources dedicated to non-navigation control. That is, rather than having one or more processing resources dedicated to non-navigation control of the vehicle, the redundant processing resource 114 may be used for non-navigation control of the vehicle when the redundant processing resource 114 is not being used for navigation control of the vehicle. When the primary processing resource 112 is functioning properly, the redundant processing resource 114 may not need to be used for navigation control of the vehicle. In such situations, the computing system 102 may not be utilizing the redundant processing resource 114. Rather than including separate processing resource(s) in the computing system 102 for non-navigation control of the vehicle, the unutilized portion(s) of the redundant processing resource 114 may be used for non-navigation control of the vehicle. Thus, existing processing resource in the computing system 102 may be used for both navigation control (as backup) and non-navigation control of the vehicle.

Non-navigation control of a vehicle may refer to control of non-movement aspects of the vehicle. Non-navigation control of a vehicle may include control of features of the vehicle that do not impact movement of the vehicle. Non-navigation control of a vehicle may include control of features of the vehicle that are provided for convenience of one or more persons in the vehicle, rather than features of the vehicle that are provided for navigation control of the vehicle.

Non-navigation control of a vehicle may include one or more tasks. Non-navigation control of a vehicle may be facilitated and/or effectuated through performance of one or more tasks. For example, a task of non-navigation control of a vehicle may refer to a piece of work to be done to facilitate non-navigation control of the vehicle. For instance, a task of non-navigation control of a vehicle may include one or more functions and/or operations to be performed to facilitate/effectuate control of (e.g., determining values of, initiating action of, changing action in progress of, planning action of) feature(s) of the vehicle that do not impact movement of the vehicle and/or provided for convenience of person(s) in the vehicle.

One or more tasks of non-navigation control of a vehicle may include one or more non-time critical tasks and/or one or more non-safety critical tasks for the vehicle. A non-time-critical task may refer to a task for a vehicle for which timeliness or speed is not a crucial factor. A non-safety critical task may refer to a task for a vehicle for which performance is not crucial to safe operation of the vehicle, such as a task performed for convenience of the person(s) (e.g., driver, passenger) in the vehicle. For example, one or more tasks of the non-navigation control of the vehicle may include one or more of passenger status detection (e.g., detecting whether a passenger has entered or exited the vehicle, detecting whether a passenger is seated, detecting whether a passenger is using a seat belt), cabin-cleanliness detection (e.g., detecting whether the cabin of the vehicle is clean, detecting trash left by a passenger, detecting whether one or more objects have been left in the vehicle by a person), in-vehicle vision analysis (e.g., controlling one or more image capture devices capturing one or more images/videos of the interior of the vehicle, analyzing image(s)/video(s) of the interior of the vehicle, performing in-cabin monitoring, checking status of multiple persons in the vehicle, monitoring interaction of multiple persons in the vehicle), in-vehicle entertainment provision (e.g., providing audible and/or visual entertainment for person(s) in the vehicle), in-vehicle communication provision (e.g., enabling communication between a remote person and a person inside the vehicle), and/or other non-time critical/non-safety critical tasks.

The priority of navigation control of a vehicle may be higher than the priority of non-navigation control of the vehicle for the usage of the redundant processing resource 114. Higher priority of the navigation control of the vehicle may result in the redundant processing resource 114 performing task(s) of navigation control of the vehicle over task(s) of non-navigation control of the vehicle. That is, the task(s) of navigation control of the vehicle may have higher priority than the task(s) of non-navigation control of the vehicle for usage of the redundant processing resource 114 such that when a task of navigation control of the vehicle and a task of non-navigation control of the vehicle is queued for processing by the redundant processing resource 114, the redundant processing resource 114 performs the task of navigation control of the vehicle before performing the task of non-navigation control of the vehicle. If the redundant processing resource 114 does not have available resource to perform a task of navigation control of the vehicle, one or more tasks of non-navigation control of the vehicle being performed by the redundant processing resource 114 may be paused and/or terminated to free up resources to perform the task of navigation control of the vehicle. The redundant processing resource 114/one or more portions of the redundant processing resource 114 may be utilized to perform task(s) of non-navigation control of the vehicle until the redundant processing resource 114/one or more portions of the redundant processing resource 114 is needed to perform task(s) of navigation control of the vehicle (e.g., due to failure of the primary processing resource 112).

One or more portions of the redundant processing resource 114 may be used to detect the failure of the primary processing resource 112. That is, rather than having separate processing resource dedicating to monitoring the primary processing resource 112 for failure, one or more portions of the redundant processing resource 114 may be used to detect the failure of the primary processing resource 112. For example, a portion of the redundant processing resource 114 may be used to monitor the primary processing resource 112 (e.g., hardware monitor, monitoring for flags indicating error/damage in the primary processing resource 112) and determine if and/or when the primary processing resource fails 112.

The usage of the available portion(s) of the redundant processing resource 114 to perform the task(s) of the non-navigation control of the vehicle may enable status check (checking status of operation/health) of the redundant processing resource 114. If the redundant processing resource 114 is not used until it is needed to perform task(s) of navigation control of the vehicle, the computing system 102 may not be aware of any problems with the redundant processing resource 114. That is, if the redundant processing resource 114 is not being used by the computing system 102, then the computing system 102 may only discover a problem (e.g., error, damage) with the redundant processing resource 114 when the redundant processing resource 114 fails to perform task(s) of navigation control of the vehicle. That is, if there is a problem with the redundant processing resource 114, the computing system 102 may not discover the problem until the primary processing resource 112 fails, the redundant processing resource 114 is needed for navigation control of the vehicle, and the redundant processing resource 114 fails to respond properly. In such a case, the vehicle may not have enough processing resource to safely perform navigation control of the vehicle.

While a processing resource dedicated to monitoring the redundant processing resource 114 for faults may be provided, such provision of resource increases the costs of the computing system 102. Rather than providing a separate processing resource to monitor the redundant processing resource 114, the usage of the redundant processing resource 114 to perform task(s) of the non-navigation control of the vehicle may be used to check the status of the redundant processing resource 114. For example, a portion of the redundant processing resource 114 that is not being used to perform a task of navigation control of the vehicle may be assigned to perform a task of non-navigation control of the vehicle. If the task of non-navigation control of the vehicle is not performed by the portion of the redundant processing resource 114, the portion of the redundant processing resource 114 and/or the redundant processing resource 114 may be determined to be faulty.

Figure 2:
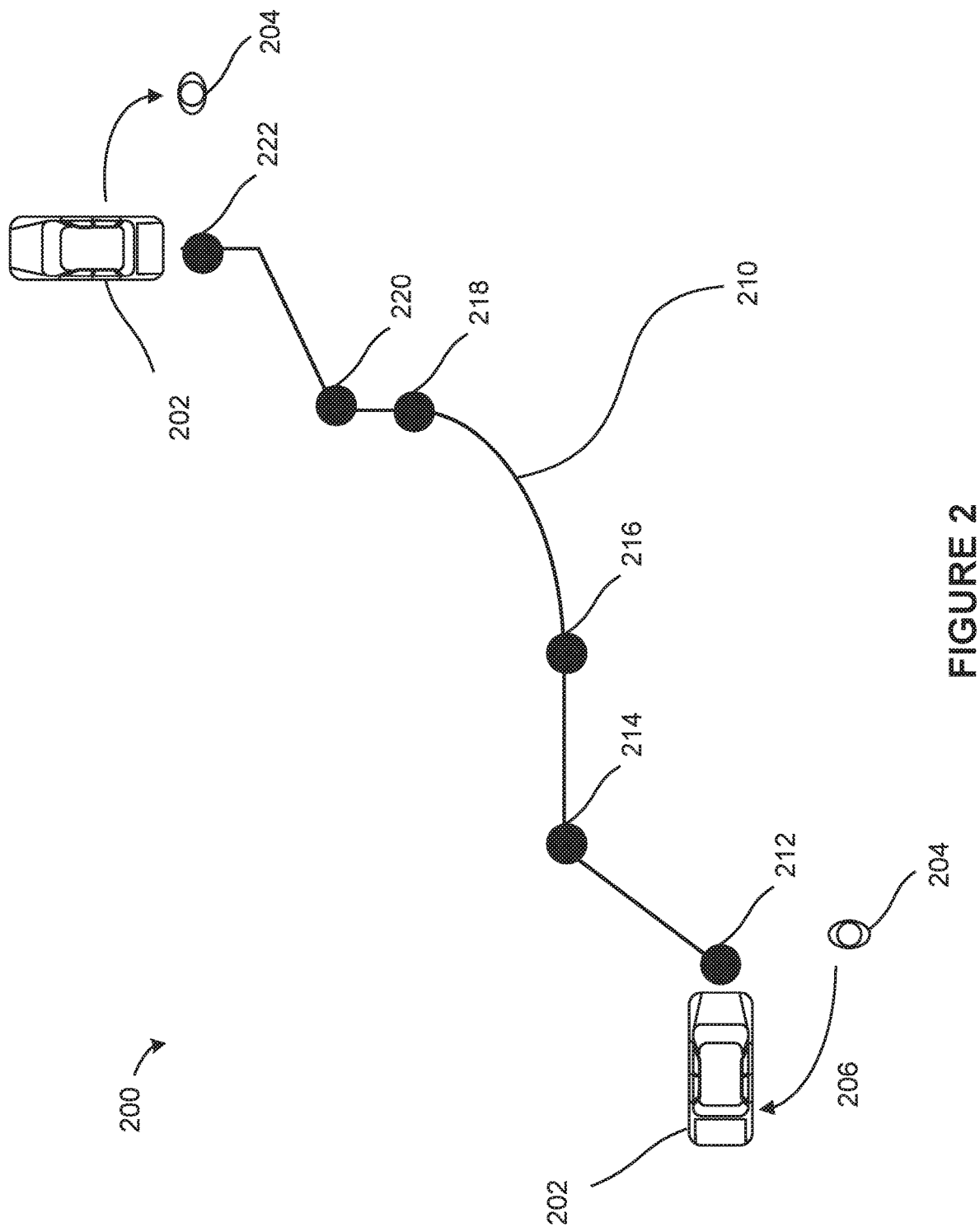
FIG. 2 illustrates an example environment in which vehicle redundant processing resource is utilized, in accordance with various embodiments.

FIG. 2 illustrates an example environment 200 in which vehicle redundant processing resource is utilized, in accordance with various embodiments. The environment 200 may include a vehicle 202 and a person 204. The vehicle 202 may include a primary processing resource dedicated to navigation control of the vehicle 202. The vehicle may include a redundant processing resource for performing one or more tasks of navigation control of the vehicle 202 based on a failure of the primary processing resource. One or more available portions of the redundant processing resource may be used by the vehicle 202 for performing one or more tasks of non-navigation control of the vehicle 202.

For example, the vehicle may travel along a path 210. The path 210 may include points 212, 214, 216, 218, 220, 222. The person 202 may enter 206 the vehicle 202 at the point 212. For instance, the person 204 may be a passenger and the vehicle 202 may be an autonomous vehicle in which the person 204 is taking a trip. During a portion of the ride, the primary processing resource of the vehicle 202 may be functioning properly, and the redundant processing resource of the vehicle 202 may be used to perform task(s) of non-navigation control of the vehicle 202. For example, the primary processing resource of the vehicle 202 may be used to move the vehicle 202 from the point 212 to the point 214 (e.g., lane change), from the point 214 to the point 216 (e.g., arriving and stopping at a left turn), and from the point 216 to the point 218 (e.g., making the left turn). From the point 212 to the point 218, the redundant processing resource of the vehicle may be used to perform tasks such as passenger status detection, cabin-cleanliness detection, in-vehicle vision analysis, in-vehicle entertainment provision, and/or in-vehicle communication provision.

At the point 218, a failure of the primary processing resource of the vehicle 202 may be detected. Based on the failure of the primary processing resource of the vehicle 202, the redundant processing resource of the vehicle 202 may be used to perform one or more tasks of navigation control of the vehicle 202. Performance of task(s) of non-navigation control of the vehicle 202 by the redundant processing resource of the vehicle 202 may be reduced, terminated, and/or paused. For instance, one or more of passenger status detection, cabin-cleanliness detection, in-vehicle vision analysis, in-vehicle entertainment provision, and/or in-vehicle communication provision may be terminated and/or paused and the redundant processing resource of the vehicle 202 may be used to move the vehicle 202 from the point 218 to the point 220 (e.g., continuing movement initiated by the primary processing resource), and from the point 220 to the point 222 (e.g., lane change and emergency/safe stop). At the point 218, the vehicle may be brought to a safe stop.

In some embodiments, the redundant processing resource of the vehicle 202 may be used to complete the ride for the passenger and/or to bring the vehicle 202 to a particular destination (e.g., home base/terminal, service provider/technician to address the fault in the primary processing resource), rather than stopping the vehicle 202 at the point 222.

In some embodiments, the extent to which performance of task(s) of non-navigation control of the vehicle 202 by the redundant processing resource of the vehicle 202 are reduced, terminated, and/or paused may depend on the amount of processing resource needed to perform task(s) of navigation control of the vehicle 202. In some embodiments, the performance of task(s) of non-navigation control of the vehicle 202 by the redundant processing resource of the vehicle 202 may be completed terminated and/or paused based on the redundant processing resource of the vehicle 202 being needed to perform task(s) of navigation control of the vehicle 202.

At the point 222, with the vehicle 202 stopped, the amount of the redundant processing resource of the vehicle 202 needed to perform task(s) of navigation control of the vehicle 202 may be reduced or eliminated. At the point 222, the redundant processing resource of the vehicle 202 may be used to perform task(s) of non-navigation control of the vehicle 202. For example, the redundant processing resource of the vehicle 202 may be used to perform one or more of passenger status detection (e.g., detecting that the passenger has exited 204 the vehicle 202), in-vehicle entertainment provision (e.g., providing entertainment to person(s) in the vehicle 202 while waiting for assistance), and/or or in-vehicle communication provision (e.g., enabling communication between person(s) in the vehicle 202 and one or more remote person(s)).

Figure 3:
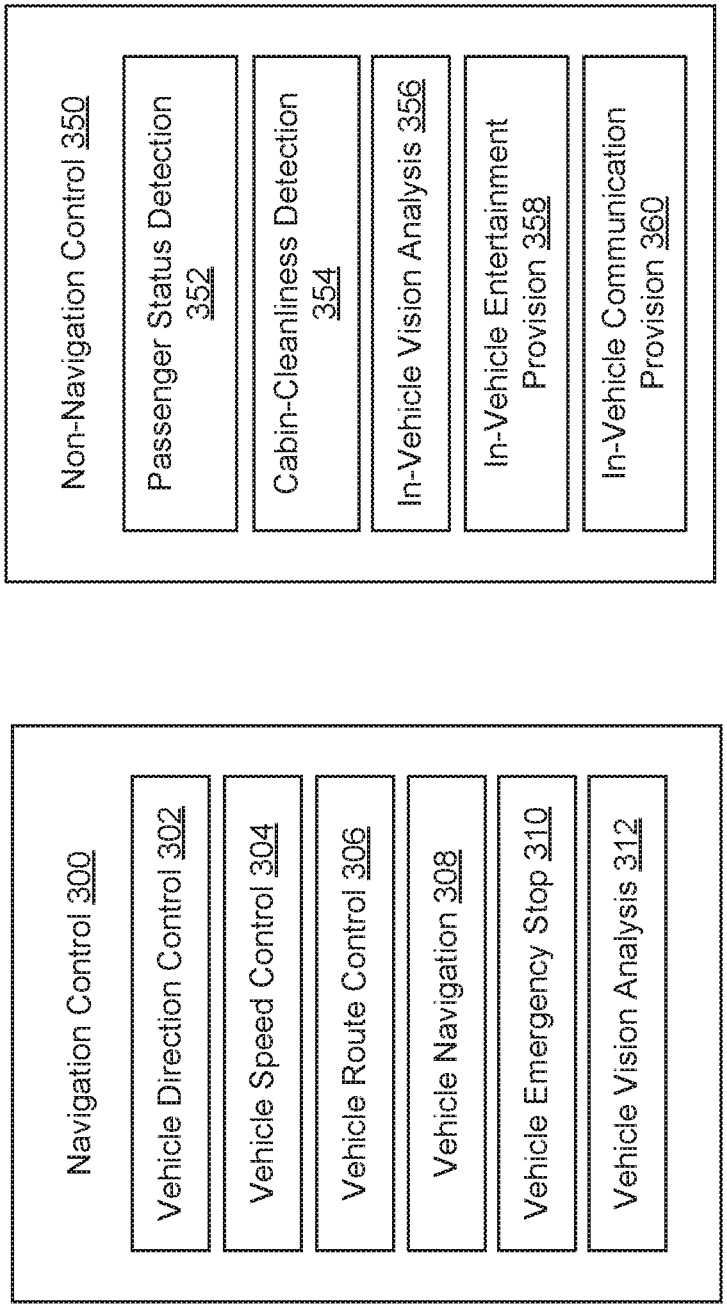
FIG. 3 illustrates examples of navigation control and non-navigation control of a vehicle, in accordance with various embodiments.

FIG. 3 illustrates examples of navigation control 300 and non-navigation control 350 of a vehicle, in accordance with various embodiments. The navigation control 300 of the vehicle may refer to control of movement of the vehicle. The navigation control 300 of the vehicle may include one or more tasks. The task(s) of the navigation control 300 of the vehicle may include one or more time critical tasks and/or one or more safety critical tasks for the vehicle. For example, the task(s) of the navigation control 300 of the vehicle may include one or more of vehicle direction control 302 (e.g., controlling direction in which the vehicle moves), vehicle speed control 304, vehicle route control 306 (e.g., determining, monitoring, and/or changing route to be taken by the vehicle), vehicle navigation 308 (e.g., the vehicle following a route/planned path and/or monitoring the vehicle's movement along a route/planned path), vehicle emergency stop 310 (e.g., stopping the vehicle in an emergency, bringing the vehicle to a safe stop in an emergency), vehicle vision analysis 312 (e.g., controlling one or more image capture devices capturing one or more images/videos of the environment of the vehicle, analyzing image(s)/video(s) of the environment for object detection, perception control/analysis for vehicle navigation), and/or other time critical/safety critical tasks.

The non-navigation control 350 of a vehicle may refer to control of non-movement aspects of the vehicle. The non-navigation control 350 of a vehicle may include one or more tasks. The task(s) of the non-navigation control 350 of the vehicle may include one or more non-time critical tasks and/or one or more non-safety critical tasks. For example, the task(s) of the non-navigation control 350 of the vehicle may include one or more of passenger status detection 352 (e.g., detecting whether a passenger has entered or exited the vehicle, detecting whether a passenger is seated, detecting whether a passenger is using a seat belt), cabin-cleanliness detection 354 (e.g., detecting whether the cabin of the vehicle is clean, detecting trash left by a passenger, detecting whether one or more objects have been left in the vehicle by a person), in-vehicle vision analysis 356 (e.g., controlling one or more image capture devices capturing one or more images/videos of the interior of the vehicle, analyzing image(s)/video(s) of the interior of the vehicle, performing in-cabin monitoring, checking status of multiple persons in the vehicle, monitoring interaction of multiple persons in the vehicle), in-vehicle entertainment provision 358 (e.g., providing audible and/or visual entertainment for person(s) in the vehicle), in-vehicle communication provision 360 (e.g., enabling communication between a remote person and a person inside the vehicle), and/or other non-time critical/non-safety critical tasks.

Figure 4:
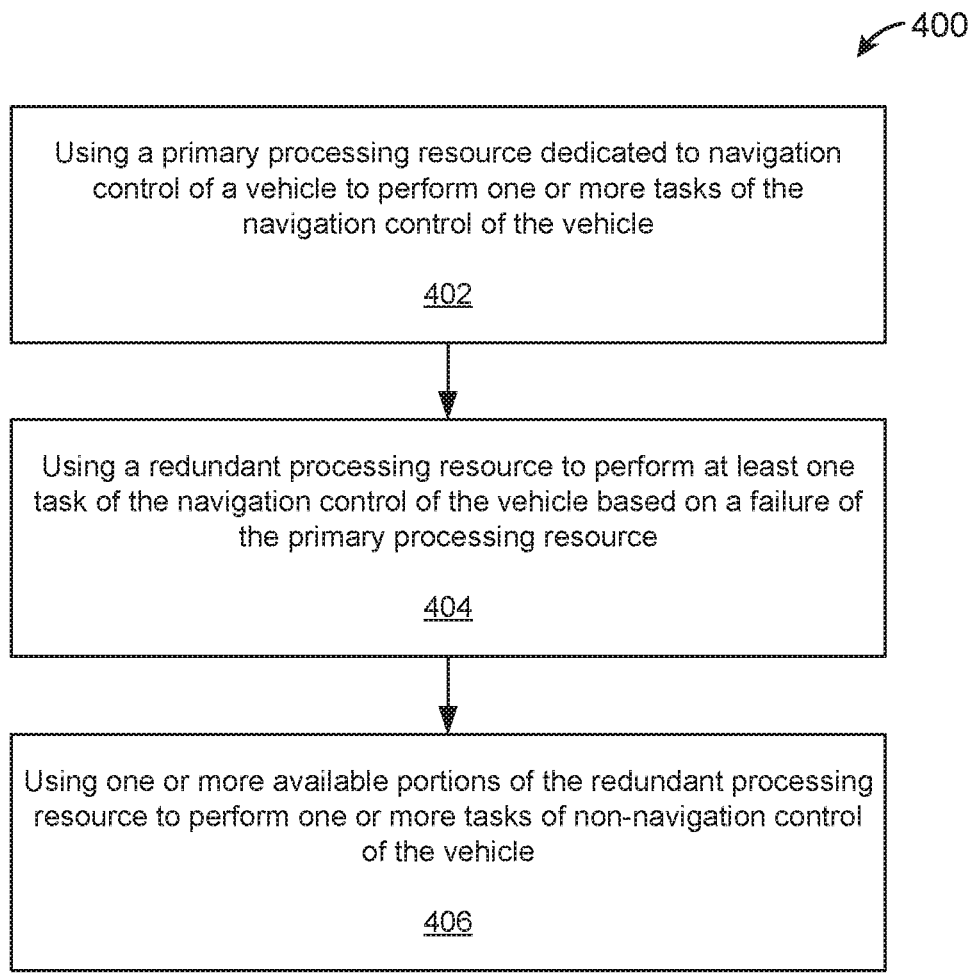
FIG. 4 illustrates a flowchart of an example method, in accordance with various embodiments.

FIG. 4 illustrates a flowchart of an example method 400, according to various embodiments of the present disclosure. The method 400 may be implemented in various environments including, for example, the environment 100 of FIG. 1. The operations of method 400 presented below are intended to be illustrative. Depending on the implementation, the example method 400 may include additional, fewer, or alternative steps performed in various orders or in parallel. The example method 400 may be implemented in various computing systems or devices including one or more processors.

At block 402, a primary processing resource dedicated to navigation control of a vehicle may be used to perform one or more tasks of the navigation control of the vehicle. At block 404, a redundant processing resource may be used to perform at least one task of the navigation control of the vehicle based on a failure of the primary processing resource. At block 406, one or more available portions of the redundant processing resource may be used to perform one or more tasks of non-navigation control of the vehicle.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
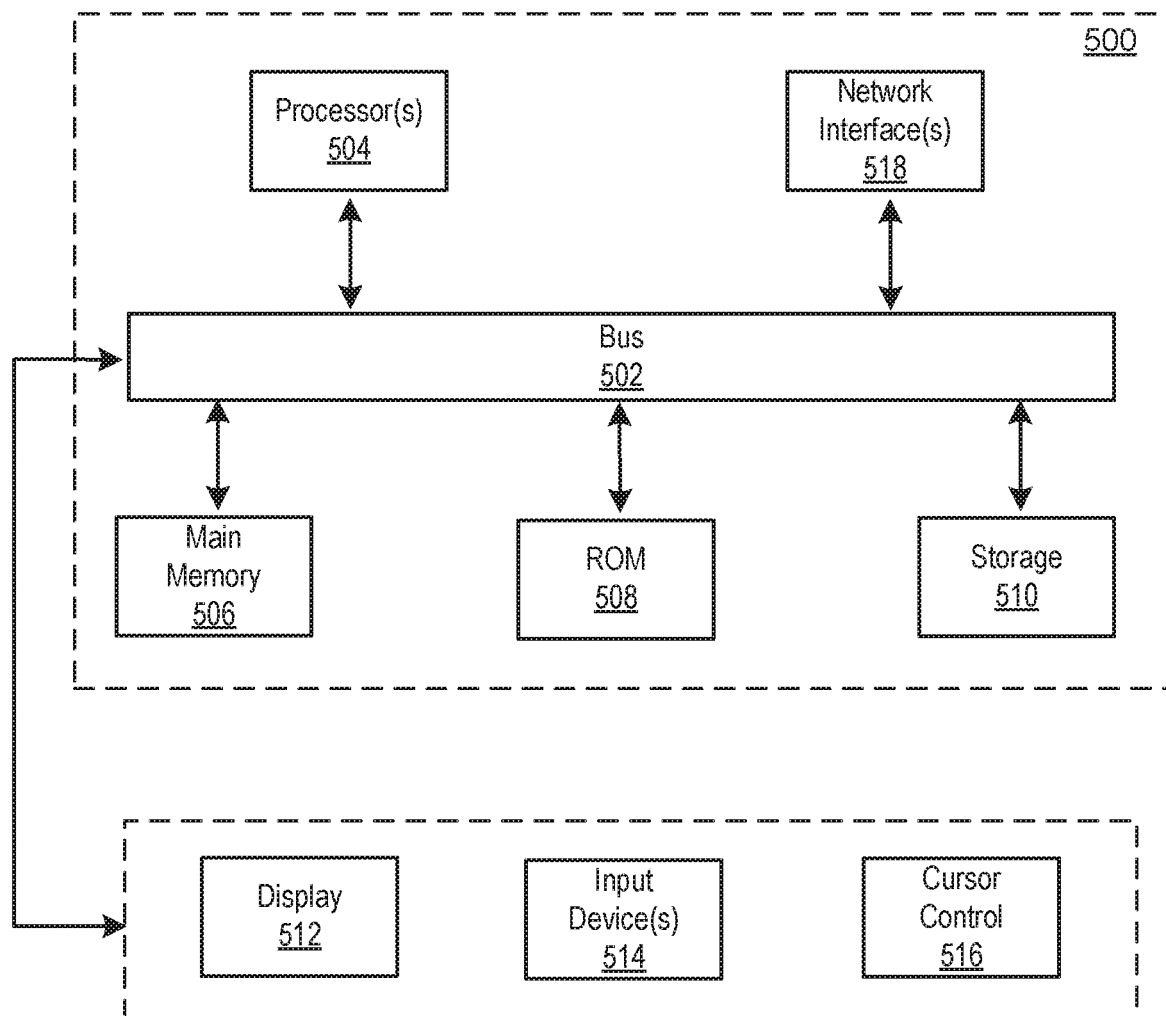
FIG. 5 illustrates a block diagram of an example computer system in which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
    a primary processor comprising hardware-based logic configured to control a navigation of a vehicle;
    a secondary processor comprising software-based logic configured to:

perform, while the primary processor is controlling the navigation, current non-navigation tasks comprising:
detecting a passenger status of a first person;
detecting a second person exiting or entering the vehicle;
detecting a cabin cleanliness;
providing entertainment within the vehicle;
enabling communication between the first person within the vehicle and a third person remote from the vehicle; and
capturing and analyzing a video in an interior of the vehicle;
indicate the performance of the non-navigation tasks;
indicate an operational status of secondary processor;
plan a future action of the non-navigation tasks of the vehicle;
detect a failure of hardware in the primary processor;
in response to the detecting of the failure of the primary processor, and in response to indicating the performance of the non-navigation tasks, perform navigation control tasks previously assigned to the primary processor, the navigation control tasks comprising:
continuing a current movement initiated by the primary processor,
planning a future action of a translational movement, an angular movement, an acceleration, a lane change, and an emergency stop, and
analyzing a video outside of the vehicle;
determine an extent to reduce, terminate or pause the non-navigation tasks based on an amount of processing resources required to be diverted to the performing of the navigation control tasks; and
reduce, terminate or pause the non-navigation tasks based on the determined extent, while performing the non-navigation tasks using one or more available portions of the secondary processor; and
in response to the vehicle being stopped during the emergency stop, abort the performance of the navigation control task and divert at least a portion of the amount of processing resources back to the performance of the detecting of the passenger status of a first person and the detection of the second person exiting or entering the vehicle, and the enabling of the communication between the first person within the vehicle and the third person remote from the vehicle, without performing the navigation control tasks;
a first controller that provides the primary processor; and
a second controller that provides the secondary processor, wherein the second controller has a same amount of processing speed, power or memory compared to the first controller.

2. The system of claim 1, wherein the primary processor performs vehicle direction control, vehicle speed control, vehicle route control, vehicle navigation, and vehicle vision analysis.

3. The system of claim 1, wherein usage of the one or more available portions of the secondary processor to perform the one or more tasks of the non-navigation control of the vehicle enables status check of the secondary processor.

4. A method implemented by a computing system including one or more processors and storage media storing machine-readable instructions, wherein the method is performed using the one or more processors, the method comprising:

using a primary processor comprising hardware-based logic to perform one or more tasks of the navigation control of the vehicle;
using a secondary processor comprising software-based logic to:
perform, while the primary processor is controlling the navigation, current non-navigation tasks comprising:
detecting a passenger status of a first person;
detecting a second person exiting or entering the vehicle;
detecting a cabin cleanliness;
providing entertainment within the vehicle;
enabling communication between the first person within the vehicle and a third person remote from the vehicle; and
capturing and analyzing a video in an interior of the vehicle;
indicate the performance of the non-navigation tasks;
indicate an operational status of secondary processor;
plan a future action of the non-navigation tasks of the vehicle;
detect a failure of hardware in the primary processor;
in response to the detecting of the failure of the primary processor, and in response to indicating the performance of the non-navigation tasks, perform navigation control tasks previously assigned to the primary processor, the navigation control tasks comprising:
continuing a current movement initiated by the primary processor,
planning a future action of a translational movement, an angular movement, an acceleration, a lane change, and an emergency stop, and
analyzing a video outside of the vehicle;
determine an extent to reduce, terminate or pause the non-navigation tasks based on an amount of processing resources required to be diverted to the performing of the navigation control tasks; and
reduce, terminate or pause the non-navigation tasks based on the determined extent, while performing the non-navigation tasks using one or more available portions of the secondary processor; and
in response to the vehicle being stopped during the emergency stop, abort the performance of the navigation control task and divert at least a portion of the amount of processing resources back to the performance of the detecting of the passenger status of a first person and the detection of the second person exiting or entering the vehicle, and the enabling of the communication between the first person within the vehicle and the third person remote from the vehicle, without performing the navigation control tasks;
providing the primary processor by a first controller; and
providing the secondary processor by a second controller, wherein the second controller has a same amount of processing speed, power or memory compared to the first controller.

5. The method of claim 4, further comprising using the primary processor to perform vehicle direction control, vehicle speed control, vehicle route control, vehicle navigation, and vehicle vision analysis.

6. The method of claim 4, wherein usage of the one or more available portions of the secondary processor to perform the one or more tasks of the non-navigation control of the vehicle enables status check of the secondary processor.

7. A non-transitory computer readable medium comprising instructions that, when executed, cause one or more processors to perform:
  using a primary processor comprising hardware-based logic to perform one or more tasks of the navigation control of the vehicle;
  using one or more available portions of a secondary processor comprising software-based logic to:
    perform tasks of non-navigation control of the vehicle while the primary processor is performing one or more tasks of the navigation control, comprising:
      detecting a passenger status of a first person;
      detecting a second person exiting or entering the vehicle;
      detecting a cabin cleanliness;
      providing entertainment within the vehicle;
      enabling communication between the first person within the vehicle and a third person remote from the vehicle; and
      capturing and analyzing a video in an interior of the vehicle;
    indicate the performance of the non-navigation tasks;
    indicate an operational status of secondary processor;
    plan a future action of the non-navigation tasks of the vehicle;
    detect a failure of hardware in the primary processor;
    in response to the detecting of the failure of the primary processor, and in response to indicating the performance of the non-navigation tasks, perform navigation control tasks previously assigned to the primary processor, the navigation control tasks comprising:
      continuing a current movement initiated by the primary processor,
      planning a future action of a translational movement, an angular movement, an acceleration, a lane change, and an emergency stop, and
      analyzing a video outside of the vehicle;
    determine an extent to reduce, terminate or pause the non-navigation tasks based on an amount of processing resources required to be diverted to the performing of the navigation control tasks; and
    reduce, terminate or pause the non-navigation tasks based on the determined extent, while performing the non-navigation tasks using one or more available portions of the secondary processor; and
    in response to the vehicle being stopped during the emergency stop, abort the performance of the navigation control task and divert at least a portion of the amount of processing resources back to the performance of the detecting of the passenger status of a first person and the detection of the second person exiting or entering the vehicle, and the enabling of the communication between the first person within the vehicle and the third person remote from the vehicle, without performing the navigation control tasks;
  providing the primary processor by a first controller; and
  providing the secondary processor by a second controller, wherein the second controller has a same amount of processing speed, power or memory compared to the first controller.

8. The non-transitory computer readable medium of claim 7, wherein the one or more tasks of the navigation control of the vehicle have higher priority than the one or more tasks of the non-navigation control of the vehicle for usage of the secondary processor.

* * * * *